July 12, 1960 P. B. ANDERSON 2,944,613
SPRING RELEASE MOUNTING FOR CULTIVATOR SHANK
Filed Sept. 9, 1957 2 Sheets-Sheet 1
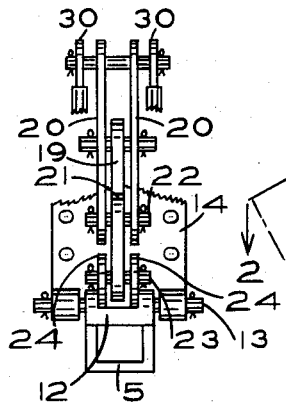
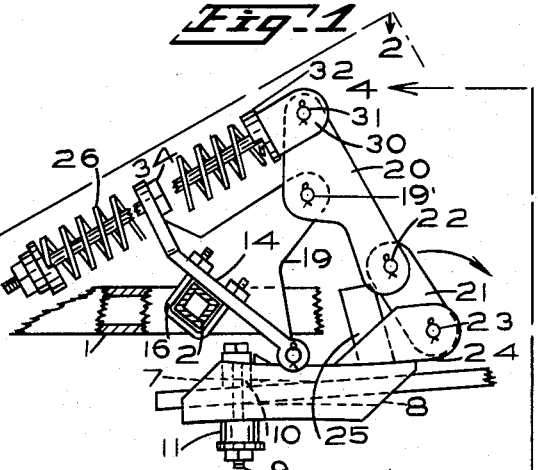
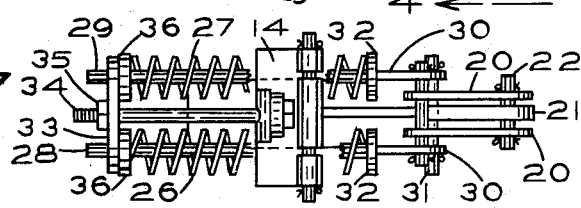
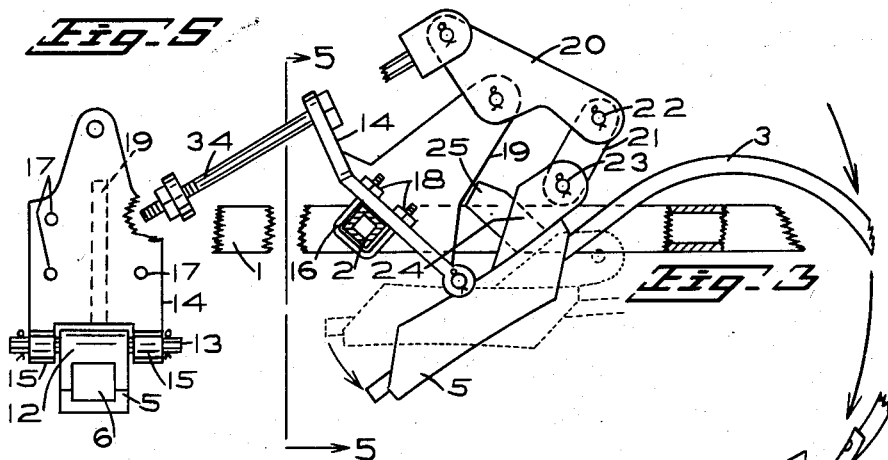
Inventor
Peter Britanius Anderson
per L. S. Mitchell
Attorney July 12, 1960 P. B. ANDERSON 2,944,613
SPRING RELEASE MOUNTING FOR CULTIVATOR SHANK
Filed Sept. 9, 1957 2 Sheets-Sheet 2
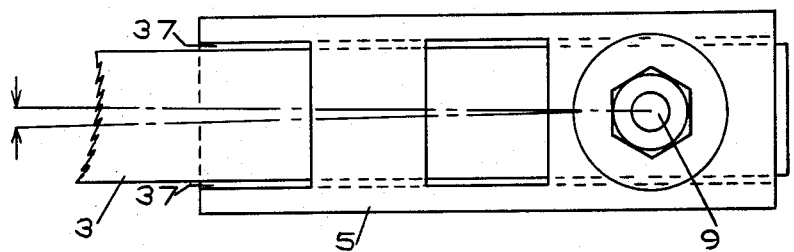
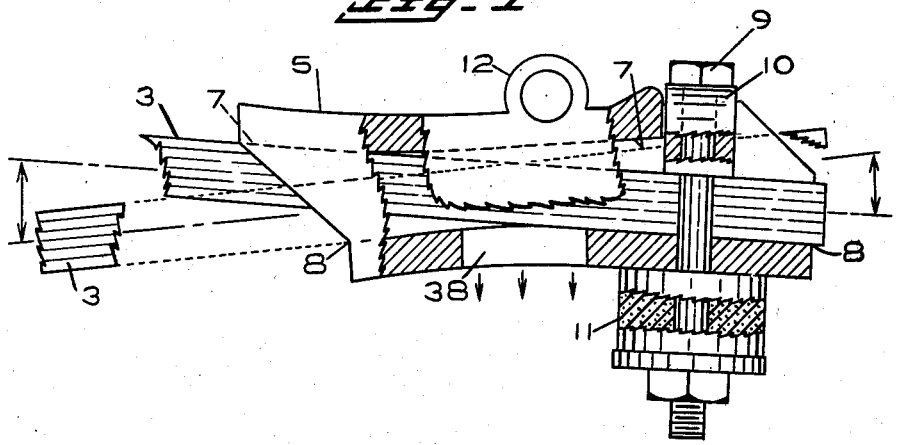
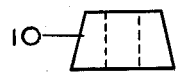
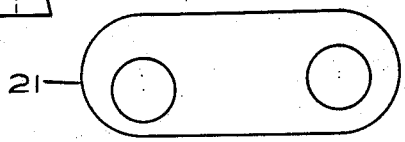
Inventor
Peter Britanius Anderson
By L. S. Mitchell
Attorney

United States Patent Office 2,944,613
Patented July 12, 1960

2,944,613

SPRING RELEASE MOUNTING FOR CULTIVATOR SHANK

Peter B. Anderson, Southey, Saskatchewan, Canada

Filed Sept. 9, 1957, Ser. No. 682,938

4 Claims. (Cl. 172—266)

This invention relates to mountings for cultivating shanks on which shovels are carried for working the soil.

Cultivator shanks are more usually rigidly carried on cross beams of a wheel supported frame, and in such when a shovel strikes a stone or other obstruction the entire frame lifts during passage of the shovel over the obstruction.

The present invention is designed to overcome this difficulty by mounting the shank pivoted to turn upwards and providing springs that normally hold the shank with the shovel in working relation to the ground, but which permit the shank to raise while the shovel is clearing the obstruction.

In the drawings which illustrate a preferred embodiment of the invention,

Fig. 1 is a side view, broken away in part and in part sectioned, of a mounting for a cultivating shovel carrying shank, showing the shank in position for working the soil with a shovel carried thereby.

Fig. 2 shows a top view of the device with parts omitted for convenience of illustration and shown broken away in part, taken on a line 2—2 of Figure 1.

Fig. 3 shows a side view of the device illustrated with the shank raised as when the shovel strikes a stone in the ground, with parts omitted and shown sectioned in part and in part broken away.

Fig. 4 shows a rear end elevation of the device taken on a line 4—4 of Figure 1, with parts omitted and broken away in part.

Fig. 5 shows a plan view of the body plate, broken away in part and including an end view of the shank holder, all as taken on a line 5—5 of Figure 3.

Fig. 6 is a top plan view of the shank holder and including the shank therein, the latter being shown as broken away.

Fig. 7 shows a side view of the holder and shank, with parts broken away and parts in section.

Fig. 8 shows a side view of the filler block.

Fig. 9 shows a plan view of the link between the holder arm and fin link plates.

Having reference to the drawings at 1 is indicated a fragment of a frame side bar of a wheel supported cultivator in which the device is carried, and with which side bar there would be a parallel side bar and cross bars at intervals, such as the cross bar 2, and on which cross bars cultivating elements would be mounted, these elements each consisting, as in the present showing, of a shank 3 with soil working shovel 4.

For the purpose of the present invention I mount the shank 3 in an elongated holder 5 with square bore 6 as viewed in cross section, the bore flaring at the ends, inclining at the top and bottom from an intermediate point, as at 7 and 8, Fig. 1, to permit a limited up and down oscillation of the shank 3 in the bore. Additionally the bore of the holder is slightly wider than the shank, as shown at 37 in Figure 6, to permit sidewise movement of the shank and by this allow the shovel 4 to move laterally when encountering an obstruction.

The shank 3 is secured in the holder 5 by a bolt 9 on which at the head end is a filler block 10 set in a suitable opening in the body of the holder and bearing against the shank 3. On the other end of the bolt 9, externally of the holder, is a collar 11 of rubber or other suitable material designed to cushion the shock when the shovel drops back after clearing an obstruction, and there is also provided an air outlet at 38 in the holder to permit the shank to snap back in place when the obstruction is cleared.

The holder 5 has a sleeve portion 12 in which is carried a pin 13 pivotally mounting a body plate 14, the plate providing trunnions 15 engaging the pin. The plate 14 is secured on a cross bar 2 by U clamps 16, one to each side, engaging in openings 17 in the body plate and secured by nuts 18.

The body plate 14 includes an outwardly projecting fin 19 on which is pivoted a link member made up of parallel link plates 20. This link member pivotally connects by a link 21 pivoting on pins 22 and 23 to the holder 5 by an arm 24 integral on the holder. The holder also includes an integral stop 25 that at one extremity of movement of the holder engages the link 21, as in Figure 1, and at the other extremity engages the fin 19, as in Figure 3, acting as a stop for the holder in each direction.

Means for holding the shank 3 with its cultivating shovel normally in working relation to the ground is provided by a spring assembly comprising two coiled springs 26 and 27 on rods 28 and 29 engaged by links 30 at one end carried by the link plates 20 on a pin 31, the links 30 including cups 32 in which the spring ends engage. At the other ends the rods 28 and 29 are engaged by a plate 33 on the end of a rod 34 held by a nut 35. This rod has its head end engaging the body plate 14. There are also included cups 36 for the ends of the springs.

In the use of the device, under normal field conditions a small obstruction would have little effect other than to cause the shank 3 to shift sidewise in the holder 5 to avoid the object, or a slight recoil would result, and for this the connection of the shank 3 on the bolt 9 is made sufficiently loose in the oversize holder to allow full play of the shank.

But where a heavy obstruction is encountered the flat upper and under sides of the shank 3 strike respectively against the rear upper tapered face 7 and lower front tapered face 8 of the holder, and these faces are like anvils against which the shank strikes, taking the initial force of the blow and protecting the linkage.

Continued upward movement with resulting pivoting of the holder 5 on the plate 14 forces the upper end of link 21 outward pivoting on the rearwardly projecting arm 24, pivoting the links 20 on the fin 19 and this in turn forces the links 30 downward tensioning the springs 26 and 27, cushioning the movement of the shank. This movement is limited by the stop 25 coming into contact with the fin 19.

In the downward movement of the shank the front upper face 7 and rear lower face 8 of the holder take the blow of the descending shank and this is cushioned by the pressure of the shank on the block 10 raising the bolt 9 and compressing the rubber collar 11.

Without this two way protection afforded the link mechanism becomes severely damaged by the pounding to which it is subjected.

In the upward movement of the shank 3 the links 20 act as a lever in the compression of the springs 26 and 27 eliminating direct thrust by the shank against the springs.

It might be noted that in the formation of the bore of the holder the pivotal bolt 9 is forwardly of the pivoting Having thus particularly described and ascertained the nature of my said invention, what I claim and wish to secure by Letters Patent is:

1. An attachment for suspension of a shovel carrying shank on a cross bar of a cultivator frame including a body plate attachable to said cross bar, a shank holder having a bore lengthwise thereof oversize of the shank, means for pivotal suspension of said holder intermediate its length from the body plate, and pivotal mounting means for said shank including a bolt through the holder vertically disposed, said shank having an opening therethrough adapted for loosely mounting the shank on the bolt within the holder to pivot vertically and horizontally relative to the holder, and the bore of the holder having the rear end portion of the upper side tapered upward and rearward and the opposing lower end portion tapered downward and rearward, and the front end portion of the upper side tapered upward and forward and the lower end portion opposed thereto tapered downward and forward.

2. A holder for a cultivator shank as in claim 1 and including a filler block on the upper end of the bolt, the holder having an enlarged opening for the bolt on the upper side to receive the filler block bearing against the shank, and a resilient collar on the lower end of the bolt bearing against the holder externally thereof.

3. An attachment for suspension of a shovel carrying shank on a cross bar of a cultivator frame, said attachment comprising an elongated holder having a bore lengthwise thereof in which the shank is receivable, a vertically disposed bolt through the bore on which the shank is loosely pivoted to swing laterally or up and down, the bore of the holder being oversize of the shank and having the upper and lower faces of the end portions thereof tapered respectively upwardly and downwardly towards the ends of the holder, said tapered faces adapted to increase the permissible up and down pivotal movement of the shank in the holder and provide flat anvil like faces against which the shank may strike, a filler block on one end of the bolt, the shank holder having an opening in which said block is receivable bearing against the shank, a collar of cushioning material on the other end of the bolt externally thereof and bearing against the holder, a body plate attachable to a frame cross bar, means for pivotal suspension of the shank holder intermediate its length from the body plate, and a spring and linkage assembly carried by the body plate, said assembly having a pivotal connection with the rear end of the holder and including springs adapted to be tensioned by upward movement of the shank.

4. An attachment for suspension of a cultivator shank as set out in claim 1 and including spring means cushioning the upward movement of the shank, said means comprising a fin on the body plate rearwardly projecting, link plates intermediately pivoted on the fin, an arm on the shank holder projecting rearwardly, a link connecting said arm and link plates, and spring means carried by the body plates pivotally connected to the link plates and adapted to be tensioned by movement of the link plates when said plates are actuated by upward movement of the shank.

References Cited in the file of this patent

UNITED STATES PATENTS

| | | |
|---|---|---|
| 150,328 | Keller | Apr. 28, 1874 |
| 2,690,111 | Altgelt | Sept. 28, 1954 |
| 2,701,994 | Jennings | Feb. 15, 1955 |

FOREIGN PATENTS

| | | |
|---|---|---|
| 573,924 | France | Mar. 20, 1924 |
| 1,132,138 | France | Oct. 29, 1956 |
| 253,298 | Great Britain | June 17, 1926 |
| 745,484 | Great Britain | Feb. 29, 1956 |